(12) United States Patent
Dickerson

(10) Patent No.: US 7,363,761 B1
(45) Date of Patent: Apr. 29, 2008

(54) EXHAUST GAS THROTTLE FOR DIVIDED TURBINE HOUSING TURBOCHARGER

(75) Inventor: Steven J. Dickerson, Lake In The Hills, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/555,256

(22) Filed: Oct. 31, 2006

(51) Int. Cl.
*F02D 23/00* (2006.01)
(52) U.S. Cl. .................................. 60/602; 60/605.2
(58) Field of Classification Search .............. 60/602, 60/605.2; 415/145, 151, 203–205
See application file for complete search history.

(56) References Cited

U.S. PATENT DOCUMENTS

| | | | | |
|---|---|---|---|---|
| 2,438,357 A | * | 3/1948 | Bloomberg | 415/68 |
| 4,689,959 A | * | 9/1987 | Houkita et al. | 60/602 |
| 4,745,753 A | * | 5/1988 | Tadokoro et al. | 60/602 |
| 4,813,232 A | * | 3/1989 | Hitomi et al. | 60/313 |
| 5,092,126 A | * | 3/1992 | Yano | 60/602 |
| 5,146,754 A | * | 9/1992 | Jain et al. | 60/602 |
| 5,943,864 A | * | 8/1999 | Sumser et al. | 60/602 |
| 6,381,960 B1 | * | 5/2002 | Mårdberg | 60/602 |
| 6,435,169 B1 | * | 8/2002 | Vogt | 123/568.23 |
| 6,941,755 B2 | * | 9/2005 | Bucknell et al. | 60/602 |
| 2005/0229597 A1 | * | 10/2005 | Finger et al. | 60/602 |

FOREIGN PATENT DOCUMENTS

JP 05209530 A * 8/1993

* cited by examiner

*Primary Examiner*—Thomas Denion
*Assistant Examiner*—Mary A Davis
(74) *Attorney, Agent, or Firm*—Jeffrey P. Calfa; Gerald W. Askew

(57) ABSTRACT

A turbocharger (107) for an internal combustion engine (100) includes a turbine having a divided turbine housing (109). A first inlet port (113) may be connected to a first volute that is formed in the turbine housing (109), and a second inlet port (114) connected to a second volute that is formed in the turbine housing (109). A center housing may be connected to the turbine housing (109), and a compressor (111) may be connected to the center housing. An exhaust gas valve (137) is in fluid communication with the first inlet port (113) and arranged to at least partially constrict a flow of exhaust gas from entering the first inlet port (113) of the turbine (109), but not constrict the flow of exhaust gas from entering the second inlet port (114).

10 Claims, 2 Drawing Sheets

EXHAUST GAS THROTTLE FOR DIVIDED TURBINE HOUSING TURBOCHARGER

FIELD OF THE INVENTION

This invention relates to internal combustion engines, including but not limited to control and operation of a turbocharger for an internal combustion engine.

BACKGROUND OF THE INVENTION

Many modern engines use variable geometry turbines (VGT) as part of turbocharger systems for refined engine control, transient response, and lower emissions. A function of a VGT depends on a position of internal vanes that direct a flow of exhaust gas to a turbine wheel. These internal vanes are also capable of modulating a pressure drop across the VGT, effectively controlling a pressure of the exhaust gas upstream of the VGT. Control of exhaust pressure in an engine is advantageous to engines having exhaust gas recirculation systems, because a pressure difference between an intake system and the exhaust system may be controlled to augment the flow of exhaust gas to be recirculated.

Current VGT designs use complicated and costly internal vane assemblies that have many moving parts. This often leads to use of exotic materials and/or precise manufacturing methods to improve the function and reliability of VGTs.

Accordingly, there is a need for providing a system which utilizes a simple, free-flow type turbocharger, that is less expensive and complicated than a VGT, but that still provides control of exhaust manifold pressure and engine intake manifold boost.

SUMMARY OF THE INVENTION

A turbocharger for an internal combustion engine includes a turbine having a divided turbine housing. A first inlet port may be connected to a first volute that is formed in the turbine housing, and a second inlet port connected to a second volute that is formed in the turbine housing. A center housing may be connected to the turbine housing, and a compressor may be connected to the center housing. An exhaust gas valve is in fluid communication with the first inlet port and arranged to at least partially constrict a flow of exhaust gas from entering the first inlet port of the turbine, but not constrict the flow of exhaust gas from entering the second inlet port.

DESCRIPTION OF A PREFERRED EMBODIMENT

Figure 1:
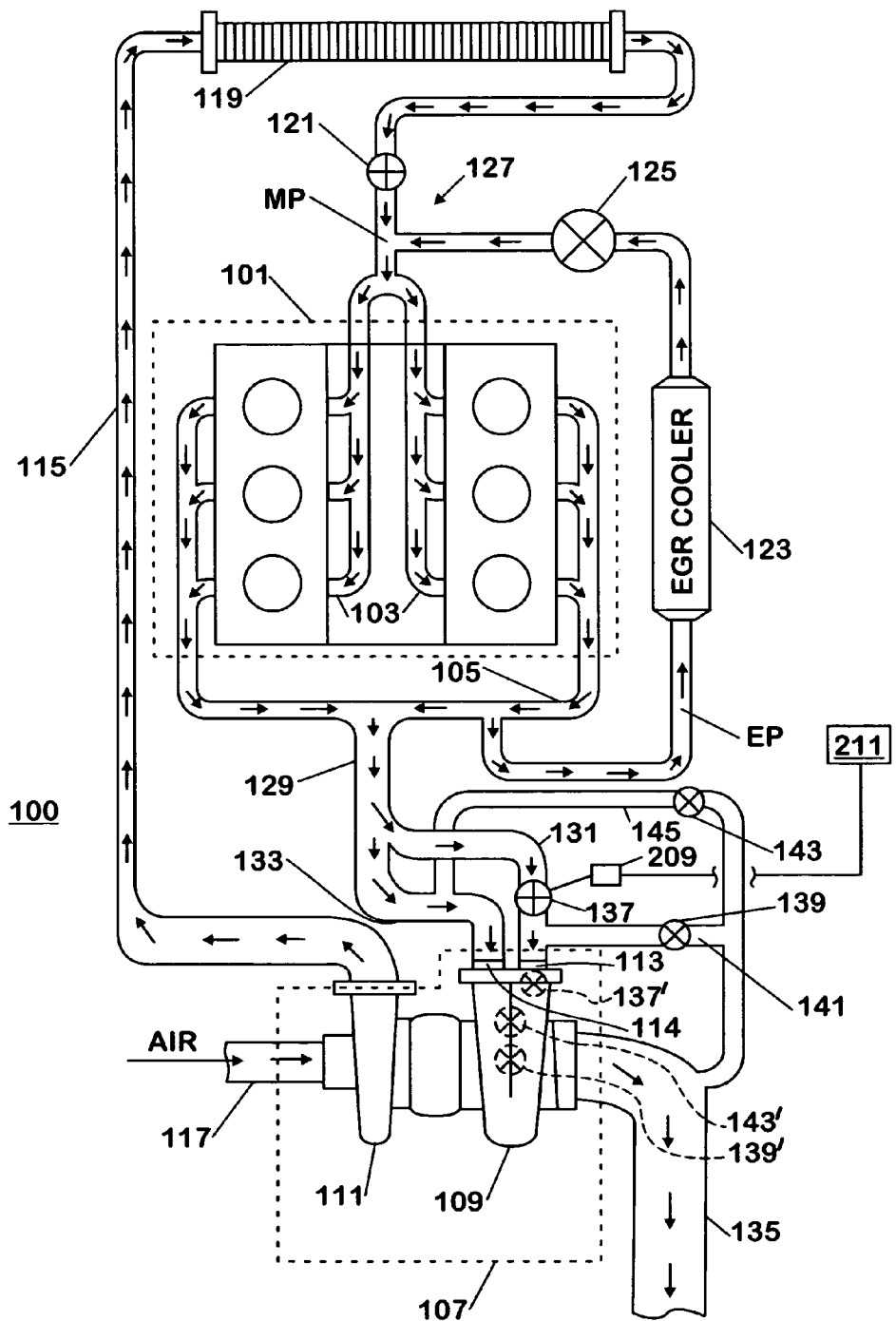
FIG. 1 is a block diagram of an engine system that includes a turbocharger and an exhaust gas control valve in accordance with the invention.

The following describes an apparatus for and method of operating an internal combustion engine with a free-flow turbocharger in place of a variable geometry turbocharger (VGT), while maintaining a desirable capability of controlling exhaust pressure of the engine in addition to improving a transient response of the engine. An engine 100 is shown in FIG. 1. The engine 100 has a block 101 that includes a plurality of cylinders. The cylinders in the block 101 are fluidly connected to an intake system 103 and to an exhaust system 105. A turbocharger 107 includes a turbine 109. The turbine 109 may be a free-flow type turbine having a divided housing. The turbine 109 may have a first turbine inlet port 113, and a second turbine inlet port 114 connected to the exhaust system 105. The turbocharger 107 may additionally include a compressor 111 connected to the intake system 103 through an inlet air passage 115.

During operation of the engine 100, air may enter the compressor 111 through an air inlet 117. Compressed air may exit the compressor 111 through the inlet air passage 115, and pass through an optional charge air cooler 119 and an optional inlet throttle 121 before entering the intake manifold 103. Exhaust gas from the exhaust system 105 may be routed to an exhaust gas recirculation (EGR) cooler 123 and pass through an EGR valve 125 before meeting and mixing with air from the inlet throttle 121 at a junction 127.

The first and second inlet ports 113 and 114 of the turbine 109 may be connected to the exhaust system 105 through a distribution manifold 129. The distribution manifold 129 may fluidly connect the exhaust system 105 to the first turbine inlet port 113 through a first supply passage 131, and to the second turbine inlet port 114 through a second supply passage 133. Exhaust gas passing through the turbine 109 may exit the engine system 100 through a tailpipe 135.

At times when the EGR valve 125 is at least partially open, a flow of exhaust gas at an exhaust pressure "EP" that exists upstream of the EGR cooler 123 flows through the EGR valve 125 and into the junction 127 where in mixes with air from the inlet throttle 121 at a manifold pressure "MP" that exists downstream of the inlet throttle 121. An amount of exhaust gas being recirculated through the EGR valve 125 may primarily depend on an opening of the EGR valve 125, and on a difference between the exhaust pressure EP and the manifold pressure MP.

On an engine having a VGT, a vane position can be adjusted to increase EP, and thus the difference between EP and MP, if such a difference is required to flow a desired EGR gas flow. A similar effect may be accomplished by lowering the MP with the inlet throttle 121. Both these solutions pose challenges in that use of a VGT to raise the EP may be expensive and complicated, while use of the inlet throttle 121 to lower the MP may undesirably increase a fuel consumption of the engine system 100. These and other issues may be avoided as described below.

Control of the EP may be accomplished by an exhaust throttle valve (ETV) 137 that is placed in fluid communication with the exhaust system 105 at a location upstream of the turbine 109, as shown in FIG. 1. The ETV 137 may advantageously be arranged to interrupt flow of exhaust gas entering one of the first or second inlet ports 113 and 114 of the turbine 109. In the case shown, the ETV 137 is arranged to interrupt flow of exhaust gas from the manifold 129 from entering the first inlet port 113.

At times when the engine 100 operates at or near an idle condition, when engine speed is low and there is little to no torque load, the ETV 137 may be in a more closed position. In this more closed position, the ETV 137 may effectively limit a flow of exhaust gas into the first inlet port 113 of the turbine 109. With the first inlet port 113 blocked, a flow area of exhaust gas out of the exhaust system 105 may be reduced, and as a result, an EP experienced by the engine and present in the exhaust system 105 may be increased. Moreover, a flow of exhaust gas into the turbine 109 through the second inlet port 114 may advantageously be accelerated and may cause a turbine wheel (not shown) in the turbine 109 to spin faster. This faster spin of the turbine wheel may advantageously improve an acceleration or transient performance of the turbocharger 107.

One additional advantage of the ETV 137 may be realized when the engine 100 operates anywhere above the idle condition. For example, at any operating condition of the engine 100, the ETV 137 may be adjusted to reduce or increase an opening into the first inlet port 113 of the turbine 109. Such an adjustment may be made to control the EP of the engine by increasing or reducing same. Such adjustments to the EP of the engine 100 may be used for various reasons, including, inducement of EGR gas flow through the EGR cooler 123, improved transient performance above the idle condition, exhaust gas temperature control for aftertreatment, and so forth.

Operation of the ETV 137 is practically able to adjust the turbine's area over radius ratio (A/R). Moreover, the turbine 109 may be adjusted for differently shaped and sized volutes. For example the volute connected to the first inlet port 113 may be smaller (have a lower A/R) as compared to the volute that is connected to the second inlet port 114. The ETV 137 may be integral with the turbine 109 as shown schematically in FIG. 1 as 137', or may alternatively be disposed as a separate component in connection with the engine 100. Optionally, wastegates may also be used to refine the ability to control operation of the turbocharger 107.

An optional first wastegate valve 139 may be located in a first bypass passage 141 that fluidly connects the first inlet port 113 with the tailpipe 135. The connection of the first bypass passage 141 with the first supply passage 131 may advantageously be located downstream of the ETV 137. An optional second wastegate valve 143 may be located in a second bypass passage 145 that may fluidly connect the second inlet port 114 with the tailpipe 135. The optional first and second wastegate valves 139 and 143 may be closed by default and open at times when the FP in the exhaust system 105 requires control in addition to the control possible with use of the ETV 137, i.e., at times when bypassing of the turbine 109 either partially or entirely is beneficial to the operation of the engine 100. The wastegate valves 139, 143 can be integrated with the turbine housing as shown schematically in FIG. 1 as 139' and 143'.

Figure 2:
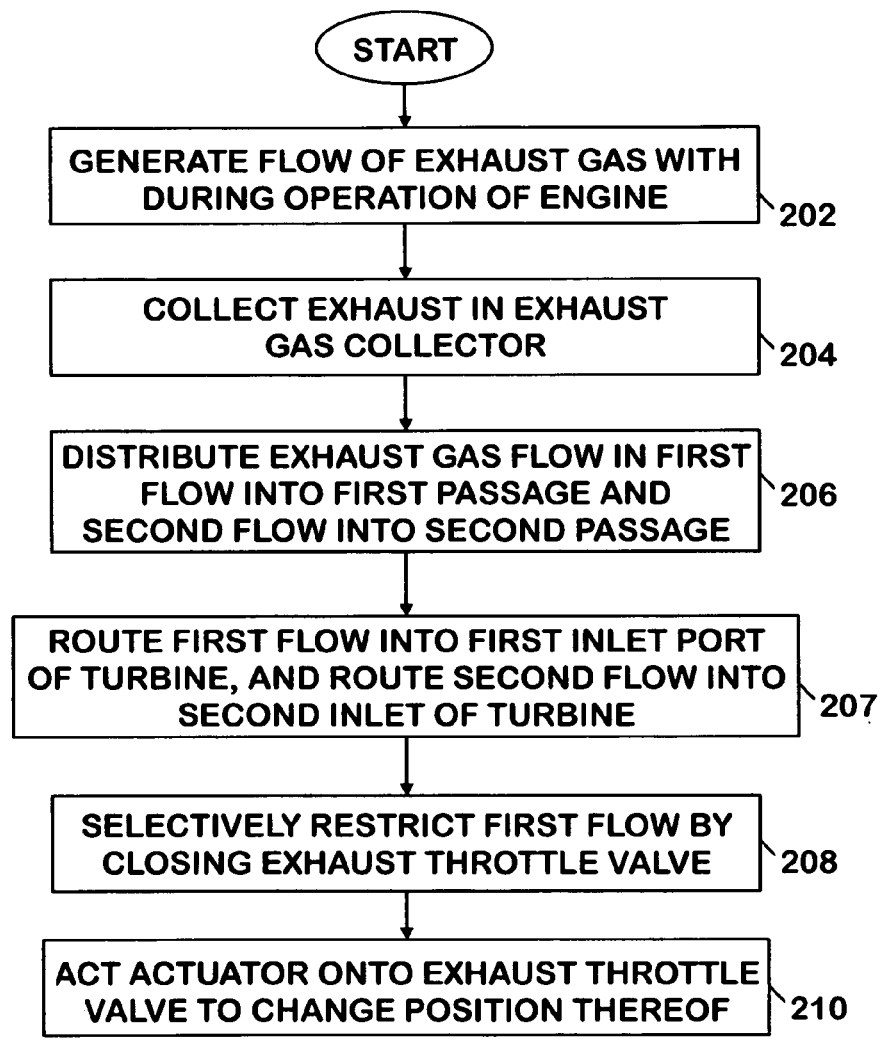
FIG. 2 is a flowchart for a method of controlling an operation of a turbocharger in accordance with the invention.

A flowchart for a method of controlling an operation of a turbocharger is shown in FIG. 2. The turbocharger may have two or more volutes formed therein, each being of similar or different geometry and size than another. An engine may operate and generate a flow of exhaust gas at step 202. The exhaust gas flow may be collected in an exhaust collector at step 204, and be distributed into a first flow and a second flow that enter a first and second exhaust passages at step 206. Each of the first and second exhaust passages may be arranged to supply their respective flow of exhaust gas to a first and second inlet ports, respectively, of a turbine, at step 207.

The first flow of exhaust gas that is routed to the first inlet port of the turbine through the first exhaust passage may be selectively restricted by closing an exhaust throttle valve at step 208, while the second flow of exhaust gas may remain unaffected by the exhaust throttle valve. The selective restriction of the first exhaust flow may be accomplished by action of an actuator 209 shown in FIG. 1 onto the exhaust throttle valve at step 210. Any action of the actuator 209 may be in response to an electronic signal from an electronic controller 211 shown in FIG. 1. The electronic controller may send a signal to the actuator based on an engine parameter, for example, a pressure in the exhaust and/or intake systems of the engine. A pressure sensor may be located on the engine and may be arranged to communicate information to the electronic controller. A wastegate valve may open to further control the exhaust and/or intake pressure of the engine.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A turbocharger for an internal combustion engine comprising:
   a turbine that includes a divided turbine housing;
   a first inlet port connected to a first volute that is formed in the turbine housing;
   a second inlet port connected to a second volute that is formed in the turbine housing;
   a center housing connected to the turbine housing;
   a compressor connected to the center housing;
   an exhaust throttle valve in fluid communication with the first inlet port, wherein the exhaust throttle valve is arranged to at least partially constrict a flow of exhaust gas from entering the first inlet port of the turbine and not constrict the flow of exhaust gas from entering the second inlet port;
   a first bypass passage that fluidly connects the first inlet port with an outlet of the turbine, and a first wastegate valve disposed in the first bypass passage; and
   a second bypass passage that fluidly connect the second inlet port with an outlet of the turbine, and a second wastegate valve, separate from said first wastegate valve, disposed in the second bypass passage.

2. The turbocharger of claim 1, wherein the exhaust throttle valve is disposed upstream of the first bypass passage.

3. The turbocharger of claim 1, wherein the exhaust throttle valve is capable of completely constricting the flow of exhaust gas from entering the first inlet port when the turbocharger is in operation.

4. The turbocharger of claim 1, wherein the exhaust throttle valve is integrated with the turbocharger.

5. An internal combustion engine comprising:
   an exhaust system connected to a base engine;
   an intake system connected to the base engine;
   a turbocharger in operable fluid communication with the exhaust system and the intake system, wherein the turbocharger includes a divided turbine housing, wherein a first portion of the turbine housing has a first inlet port, wherein a second portion of the turbine housing has a second inlet port, wherein the first inlet port is connected to the exhaust system through a first supply passage, and wherein the second inlet port is connected to the exhaust system through a second inlet passage;
   an exhaust throttle valve disposed in the first supply passage, wherein the exhaust throttle valve is arranged to obstruct fluid communication between only the first inlet port and the exhaust system;
   a first bypass passage fluidly connecting an outlet of the turbine housing with the first inlet port downstream of the exhaust throttle valve, wherein a first wastegate is disposed in the first bypass passage; and a second bypass passage fluidly connecting an outlet of the turbine housing with the second inlet port, wherein a second wastegate, separate from said first wastegate, is disposed in the second bypass passage.

6. The internal combustion engine of claim 5, wherein the first portion and the second portion of the turbine have an equal area to radius ratio.

7. The internal combustion engine of claim 5, wherein at least one of the exhaust throttle valve, the first wastegate, and the second wastegate, are integrated with the turbine housing.

8. The internal combustion engine of claim 5, further comprising an electronic controller connected to an actuator, wherein the actuator is operably associated with the exhaust throttle valve, and wherein the actuator is arranged to change a position of the exhaust throttle valve in response to a signal from the electronic controller.

9. A method for operating a turbocharger on an internal combustion engine comprising the steps of:
generating a flow of exhaust gas during operation of the engine;
collecting the flow of exhaust gas in a collector;
distributing the flow of exhaust gas from the collector into a first flow portion and a second flow portion;
routing the first flow portion to a first turbine inlet port of a divided turbine housing through a first supply passage;
routing the second flow portion into a second turbine inlet port of the divided turbine housing through a second supply passage;
selectively restricting the first flow portion into the first turbine inlet port;
changing a position of an exhaust throttle valve disposed in the first supply passage;
activating an actuator that is operably associated with the exhaust throttle valve in response to an electronic signal from an electronic controller;
adjusting a first wastegate and a second wastegate at or near idle conditions by bypassing a portion of the first flow portion around the turbine by opening the first wastegate that is disposed in a first bypass passage that fluidly connects the first turbine inlet port with an outlet of the turbine; or
bypassing a portion of the second flow portion around the turbine by opening the second wastegate that is disposed in a second bypass passage that fluidly connects the second turbine inlet port with an outlet of the turbine.

10. The method of claim 9, wherein the electronic signal in the activating step is based on an engine operating parameter that includes at least one of an exhaust gas pressure and an intake air pressure.

* * * * *